J. DODIN.
Lamp Burner.

No. 37,220. Patented Dec. 23, 1862.

Witnesses
James Edgar
J. O. Whitcomb

Inventor
Joseph Dodin

UNITED STATES PATENT OFFICE.

JOSEPH DODIN, OF BROOKLYN, NEW YORK.

IMPROVEMENT IN COAL-OIL BURNERS FOR LAMPS.

Specification forming part of Letters Patent No. 37,220, dated December 23, 1862.

*To all whom it may concern:*

Be it known that I, JOSEPH DODIN, of the city of Brooklyn, county of Kings, and State of New York, have invented an Improvement on Kerosene or Coal Oil Burners; and I hereby declare that the following is a full, clear, and exact description of the construction of the same, reference being had to the annexed drawings, making part of this specification—

Figure 1:
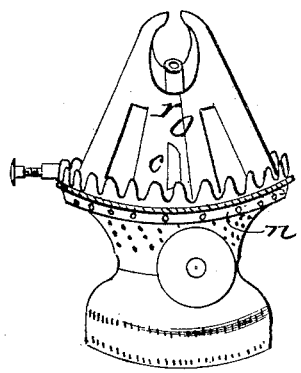
Figure 2:
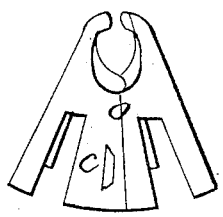
Figure 3:
Figure 4:
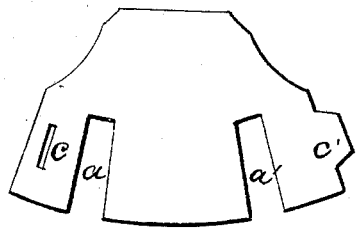
Figure 5:
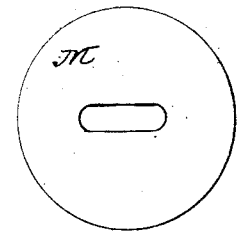

Figure 1 is a perspective view of the burner complete. Fig. 2 is a perspective view of the cone. Fig. 3 is the wick-tube, also in perspective. Fig. 4 is the shape of one of the halves of the cone when flattened. Fig. 5 is at circular plate or disk upon which the cone rests.

The object of this invention is to enable persons having the ordinary chimney-burners now in use to use the same without a chimney. Therefore, to enable persons engaged in the manufacture of lamps to make and use my invention, I will proceed to describe its construction and operation.

All that part below the cone o, Fig. 1, is similar in construction to those now in use for burning coal-oil with a chimney so far as the raising and the lowering of the wick is concerned, and also the position of the wick and wick-tube r, Fig. 1. The cone o is made of thin metal in two equal parts, each part being of the shape seen at Fig. 4, and having the slots a a. The circular plate Fig. 5 is of the proper diameter to fit the ring n, Fig. 1, and resting upon a shoulder made upon its inside surface, and having an oblong slot in its center of the proper size to fit the wick-tube r, Fig. 1. Fig. 3 is a separate tube, that fits over the wick-tube r, Fig. 1. The two parts of the cone o are both formed in the same die, of such shape as to make the cone, when locked together at the two sides c c, Fig. 4, circular at the bottom and the same shape at the top, as seen in Fig. 2.

Operation: The plate Fig. 5 is now placed in the ring n, Fig. 1. The tube Fig. 3 is placed over the wick-tube r, Fig. 1, so as to form and be part of the wick-tube r, at the same time extending it to a point near the top of the cone o by placing the cone o upon the plate Fig. 5. The wick-tube having been supplied with wick and the whole put on the lamp with the oil therein it will be ready to light.

What I claim as new, and desire to secure by Letters Patent, is—

1. The particular shape of the plate Fig. 4, with its slots a a, substantially as described.
2. The circular plate Fig. 5, with its slot M, in combination with the movable tube, Fig. 3.

JOSEPH DODIN.

Witnesses:
   JAMES EDGAR,
   I. O. WHITCOMB.